United States Patent
Alsman

[11] Patent Number: 5,551,763
[45] Date of Patent: Sep. 3, 1996

[54] FORMED WHEEL TIRE AND METHOD

[75] Inventor: Edward R. Alsman, Priddis, Canada

[73] Assignee: Polyair Tires, Inc., Calgary, Canada

[21] Appl. No.: 305,023

[22] Filed: Sep. 13, 1994

[51] Int. Cl.$^6$ ........................................ B60C 7/24
[52] U.S. Cl. .............................. 301/64.7; 152/323
[58] Field of Search ................... 301/64.7, 64.2, 301/64.5, 64.3, 64.4; 264/311; 152/323, 324, 329, 396, 399, 402, 403

[56] References Cited

U.S. PATENT DOCUMENTS

| | | | |
|---|---|---|---|
| 2,692,801 | 10/1954 | Rosenberg | 152/323 X |
| 3,695,728 | 10/1972 | Haussels | 301/64.7 X |
| 3,862,779 | 1/1975 | Jayne | 301/64.2 X |
| 3,870,372 | 3/1975 | Knipp | 301/64.7 |
| 3,894,776 | 7/1975 | Black | 301/64.7 X |
| 3,952,786 | 4/1976 | Kreling et al. | 301/64.7 X |
| 4,453,993 | 6/1984 | Rau et al. | 264/311 X |
| 4,562,031 | 12/1985 | Rossi | 264/311 X |
| 4,818,034 | 4/1989 | Djerf | 301/64.7 |

*Primary Examiner*—Russell D. Stormer
*Attorney, Agent, or Firm*—Herman J. Hohauser

[57] ABSTRACT

The main distinctive feature of the new design is that the rim has an O-shape of cross-section instead of the conventional U-shape (channel) of cross-section to hold a solid of filled tire is disclosed. The rim assembly or disc type of wheels, for example as one shown in FIG. 2, consists of two half pieces, separating along a central plane. The half pieces are first molded and then are bonded to form a light, hollow and strong rim and wheel assembly. A wheel assembly having a solid tire is made by pouring formed polymer materials such as polyurethane into a rotating mold in which the rim assembly is used as an insert. Use of rotating/reaction casting method can achieve a very high productivity. Optionally a double shot molding may be employed to concentrate strong rigid material such as glass filled nylon in the flat cone and softer polypropylene in the rim.

1 Claim, 7 Drawing Sheets

FORMED WHEEL TIRE AND METHOD

BACKGROUND OF THE INVENTION

The present invention is related to a combination of a wheel and tire. It finds particular usage on bicycles, but the same can be used on numerous other vehicles not the least of which is a rickshaw, small carriage, and related vehicles.

BACKGROUND OF THE INVENTION

The traditional tire for use on a bicycle is an inflatable tube. It may be with or without an inner tube. Normally such tires are secured in a U-shaped rim on the periphery of the wheel. They rely on the tensile strength of the tire to maintain the same in the rim. Molded tires have also been employed. A highly successful type is exemplified in Canadian Patent No. 1,185,641.

Molded urethane tires for mounting on ordinary bicycle wheels suffer some of the following disadvantages:

1. The tension members have to be placed in molds before the tires are cast. It is time consuming and expensive.

2. Since the tension member is the critical to obtain the best result, the location of the tension members has to be optimized. This is a difficult task. If the tension members are set in the mold in a slightly larger diameter than the desired, the tires may be rolled off from the rims during riding. If diameters of the tension members are slightly smaller than the optimum, it will be difficult to mount the tires on the wheels.

3. Since the wheel structure is designed for pneumatic tires, when the wheels are equipped with the solid tires, their shock absorption and load bearing capacity are seriously affected. Consequently, the dynamic load acts on the bicycle frame, which results in shorter bicycle life.

4. The edges of the rims in a typical configuration also act as a cutting device and can split the foam tire under normal stress.

5. Above all, the rim channel structure of the conventional wheels is specifically designed for mounting and holding the pneumatic tires with bead wires. Obviously, this structure does not have any special consideration in accommodating the solid tire structure. For the tires directly molded on the ordinary wheels, the problems 3 and 4 remain. In addition, the following issues need to be considered:

A. Extra materials have to fill the rim channels.

B. Shock absorption only relies on the tires, which might not be enough.

C. Because of removal of tension members, it is possible that the tires are rolled off from the rim during riding with the rim channel structure. This imposes a serious safety problem.

Also, tires made of an elastomer or polyurethane foam require some method of preventing them from elongating and rolling off the rim in use, as elastomers soft enough to provide a cushioning effect have relatively low tensile modulii. Such methods normally involve embedding into the tire a flexible tension member constructed of a material with the appropriate tensile stiffness. The objective is to have the resulting tensile stiffness of the composite tire such that the load required to stretch the tire on and off the rim is higher than the loads encountered in use. This allows the tire to be mounted, yet prevents it from inadvertently rolling off in normal usage.

Materials used as tension members include natural and synthetic fiber and cord such as nylon, polyester and cellulose, and metal wires or coils. A more comprehensive description of the theory and practice is given in Canadian Patent No. 1,119,927 granted to Gates Rubber Company.

A more recent innovation was to manufacture the tire from self-skinning flexible microcelular polyurethane foam. In this concept the foam interior provides the flexibility for the shock absorption characteristics, while the unfoamed skin on the outer surface provides the wear resistant riding surface. Various means can be used to hold the tire on the rim including tension members and gluing of the tire on to the rim. A complete description of the concept can be found in Canadian Patent No. 1,032,455, and a detailed disclosure of a suitable urethane foam formulation is given in Canadian Patent No. 1,092,296. Both of these patents were granted to Goodyear Tire and Rubber Company.

Polyurethane foam products of this type are molded. In order to mold a tire shaped object the mold should be filled under some pressure to prevent surface defects caused by air pockets. This pressure can be obtained by injecting the preblended liquid urethane components into a sealed and pressurized mold, or else by rotating the mold while pouring in the preblended liquid urethane components. Both of these methods are used extensively in casting products from various materials.

The preferred version of the prior art is to produce a polyurethane foam tire with an embedded tension member. The preferred location of the tension member is near the inside diameter of the tire. Current practice has tension members located at or about he center of the tire cross-section near the inside diameter of the tire. However, current methods of producing polyurethane foam tires suffer from difficulties in economically mass producing the tires. A particularly troublesome aspect is to ensure full coverage of the tension member by the urethane foam.

Preblended liquid urethane components expand as they react to form urethane foam. Thus to completely fill the mold cavity with unfoamed material is extremely wasteful as a volume of foam equal to the degree of expansion would be forced out of the mold. However, when only enough material to form the tire is introduced into the mold, the liquid congregates at the outside diameter of the mold, especially if the mold is being rotated. As a result, tension members near the inside of the mold are not immersed in the liquid material. Instead the tension members must be engulfed by the expanding urethane foam which is already in a state best described as semi-solid, so molding flaws result. The difficulty of covering the tension member by this expanding semi-solid foam is increased if the tension member is located near a wall of the mold.

SUMMARY OF THE INVENTION

The main distinctive feature of the new design is that the rim has an O-shape of cross-section instead of the conventional U-shape (channel) of cross-section to hold a solid of filled tire. The rim assembly or disc type of wheels, for example as one shown in FIG. 2, consists of two half pieces, separating along a central plane. The half pieces are first molded and then are bonded to form a light, hollow and strong rim and wheel assembly. A wheel assembly having a solid tire is made by pouring formed polymer materials such as polyurethane into a rotating mold in which the rim assembly is used as an insert. Use of rotating/reaction casting method can achieve a very high productivity. Optionally a double shot molding may be employed to concentrate strong rigid material such as glass filled nylon in the flat cone and softer polypropylene in the rim.

The wheel assembly created by the present invention has many objects and advantages over the conventional pneumatic wheels, some of which are the following:

1. Conventional wheels are designed to accommodate the mounting of a pneumatic tube and tire, and bead wires on the tire hold the tire on the wheel when inflated. As those wheels are used for solid tires, tension members are imbedded in the tire to hold the tires on the wheels. The new wheels designed by the present invention eliminate the need for such tension members.
2. Placing tension members in the mold prior to casting a solid tire is the most time consuming labor expensive in the entire process. The elimination of tension members results in eliminating that function.
3. The elimination of tension members avoids many difficulties both in design and manufacturing such as accurate determination of location of tension members.
4. The new wheel structure increases the capability of bearing side loads for a solid tire.
5. Using conventional rims to make a solid tire requires filling of the rim channel with formed polymers in order to bond the tire to the rim. It wastes expensive materials and increases the weight. In the present invention, the U channel is replaced by a formed convex rim, so this problem is avoided.
6. Conventional wheels rely on tires for shock absorption. The new structure provides additional flexibility and shock absorption. It also reduces the risk of rim and wheel damage which is caused by sudden or severe impacts.
7. The new wheel significantly simplifies the manufacturing process which results in saving the labor costs.
8. A solid disc wheel offers good aerodynamic property and great potential for visual graphics.
9. The new wheel reduces heat build-up in the tire which in turn reduces rolling resistance.
10. When a solid tire is used in a conventional rim assembly, the tire sits on the edges of the rim. These edges act as cutting devices, and also cause high stress concentrations around the shoulders. Therefore, the crack failure of tires often occurs. The new wheel structure eliminates such a problem.

Another one of the objects of this invention is to overcome the manufacturing difficulties associated with producing a foam tire with embedded tension member(s).

BRIEF DESCRIPTION OF THE ILLUSTRATIVE DRAWINGS

Further objects and advantages of the present invention will become apparent as the following description of an illustrative embodiment proceeds, taken in conjunction with the accompanying drawings, in which.

Figure 4A:
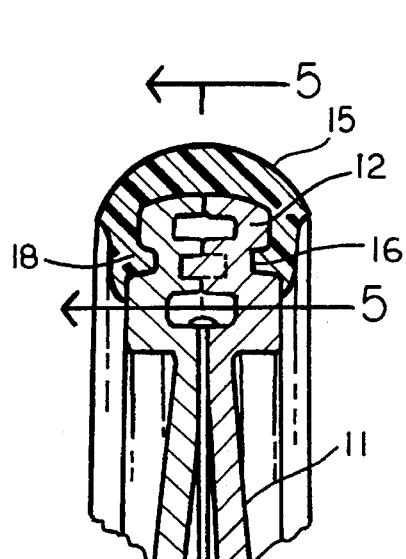
FIG. 4A is a transverse sectional view through a combination tire and wheel illustrative of the present invention.
Figure 4B:
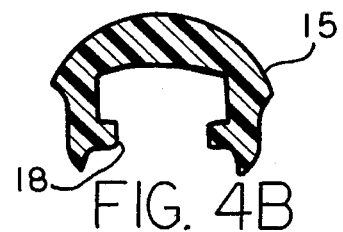
Figure 4C:
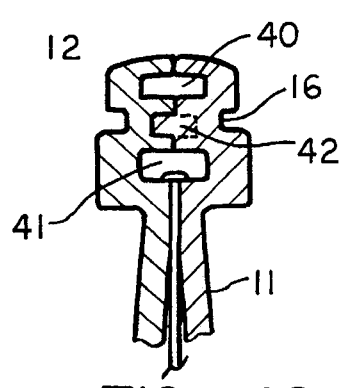
Figure 5:
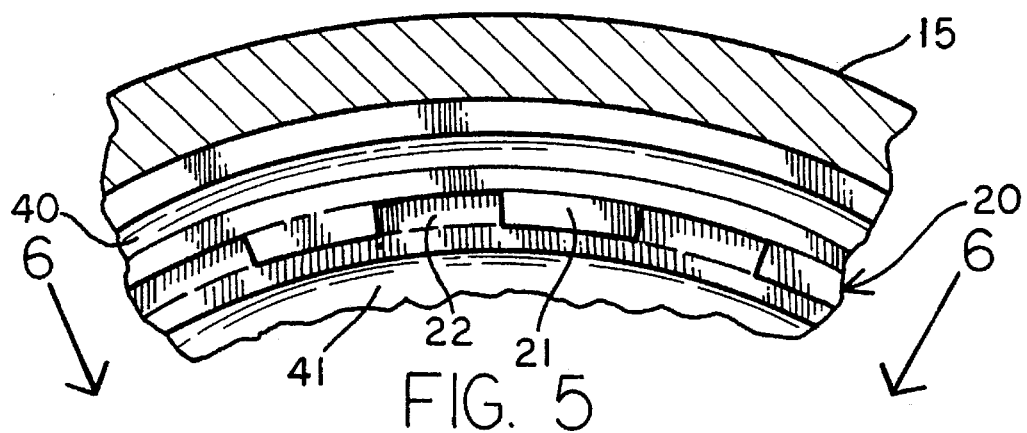
Figure 6:
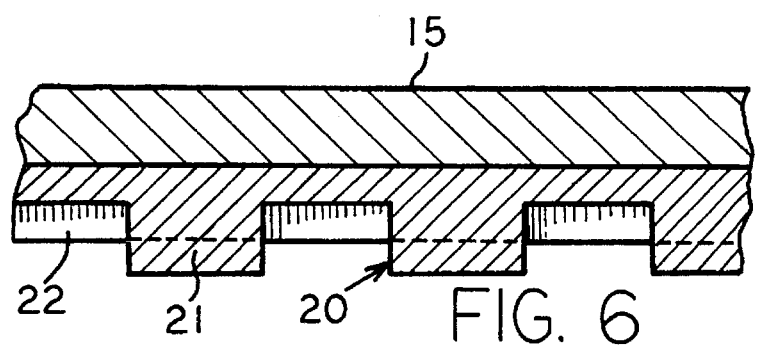
Figure 7:
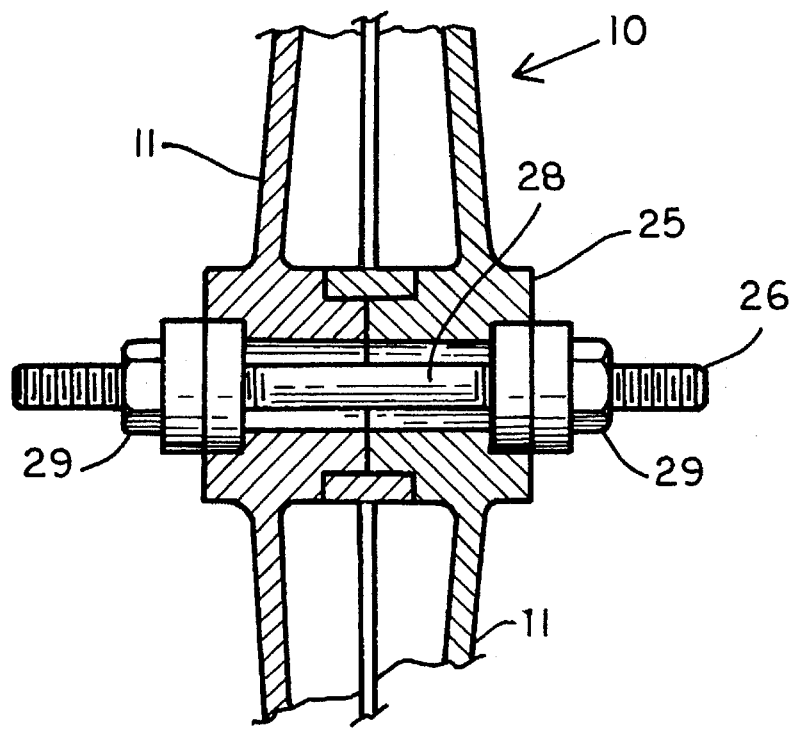
Figure 8:
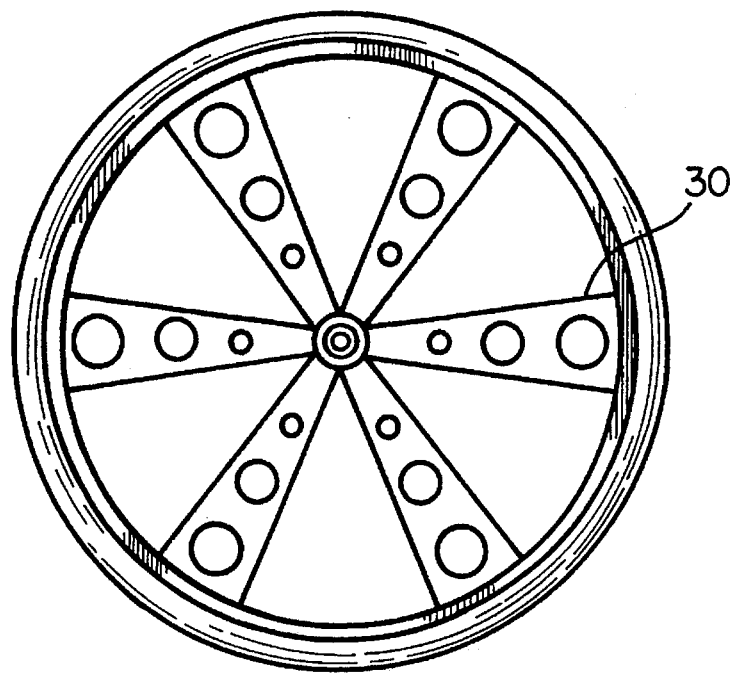
Figure 9:
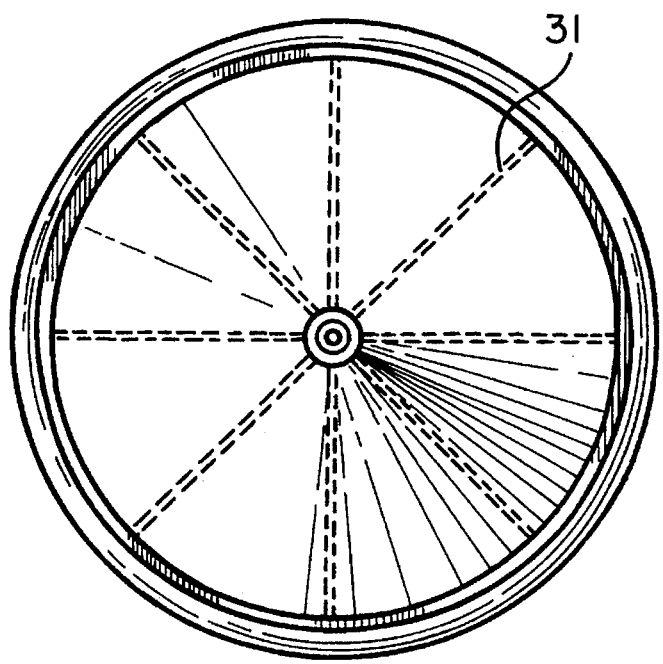
Figure 10:
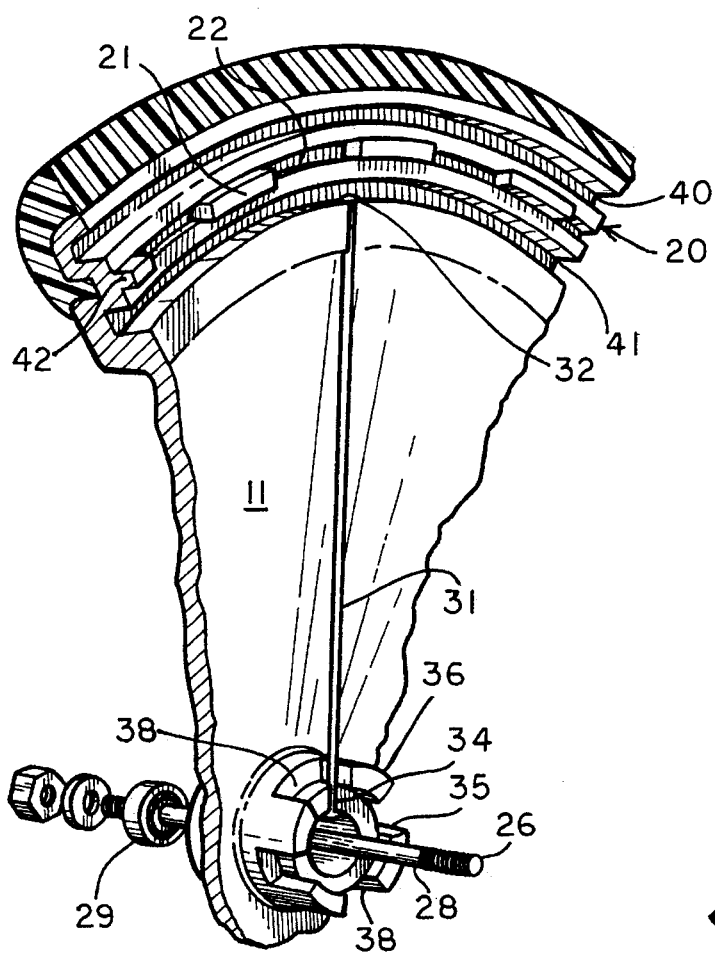
Figure 13:
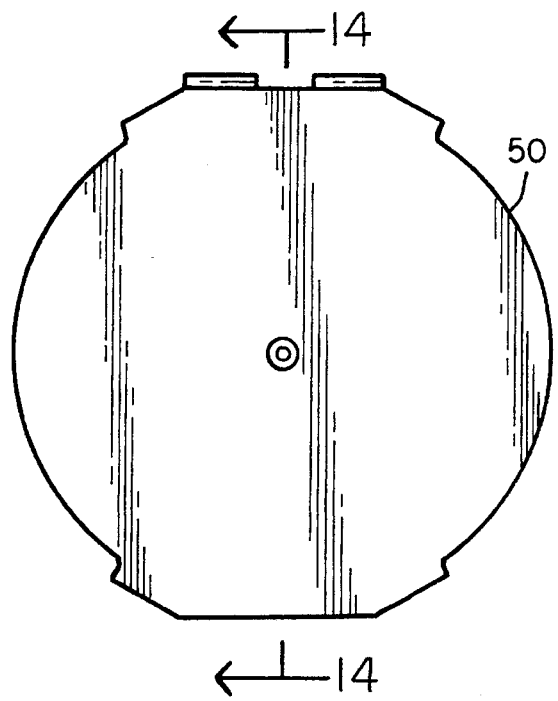
Figure 11:
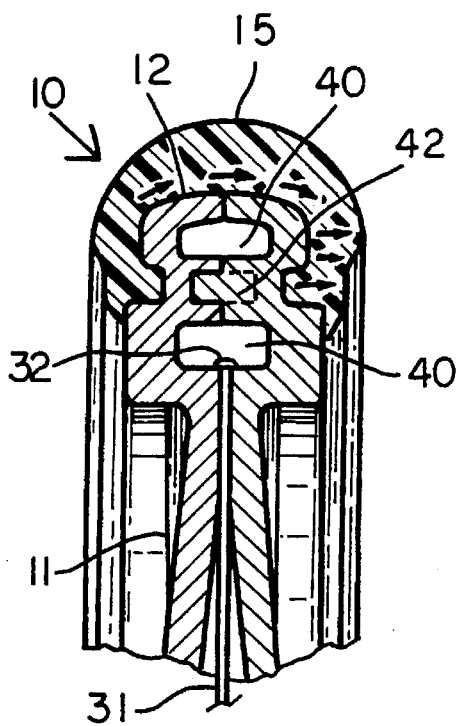
Figure 12:
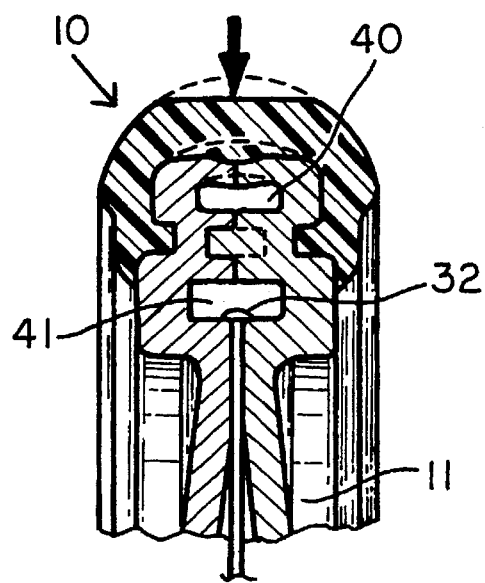
Figure 14:
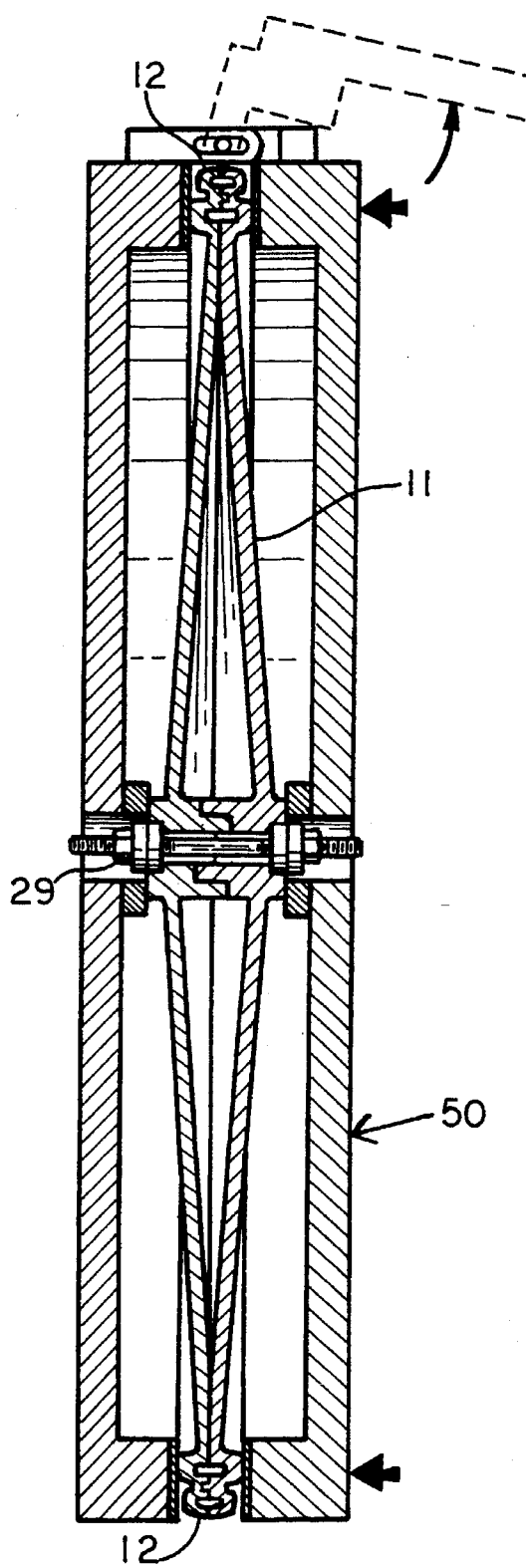
Figure 15:
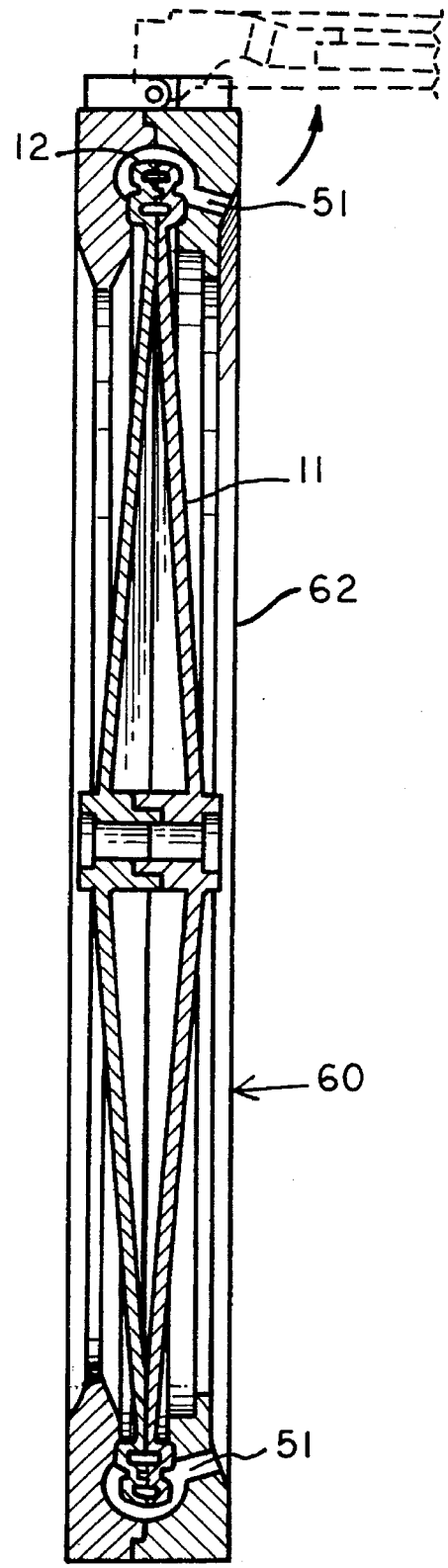
Figure 16:
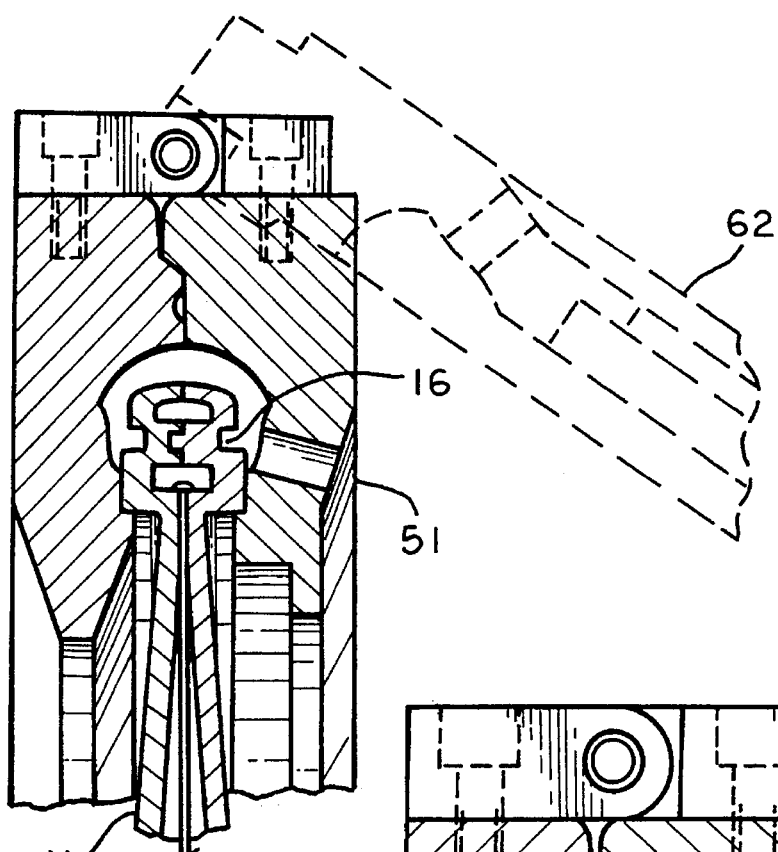
Figure 17:
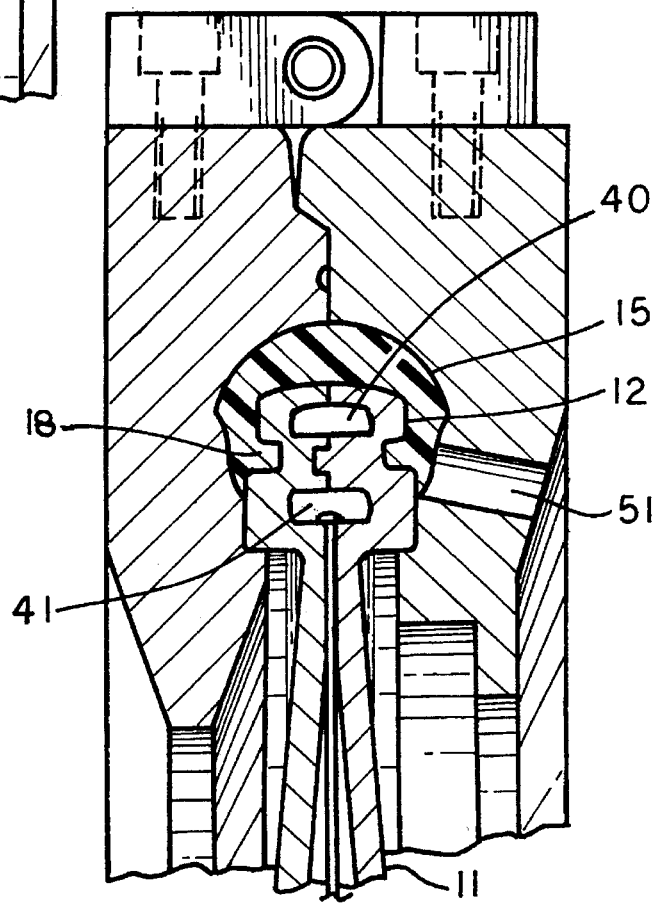

FIG. 4B includes the tire portion shown in FIG. 4A;

FIG. 4C shows the rim portion of the assembly shown in FIG. 4A;

FIG. 5 is a transverse arcuate sectional view taken along section lines 5—5 of FIG. 4 showing the interlocking elements;

FIG. 6 is an arcuate sectional view taken along section line 6—6 of FIG. 5 illustrating the mechanical interlock between the opposite sides of the rim;

FIG. 7 is a sectional view taken through the center of the hub and axle;

FIG. 8 is a diagrammatic showing of spokes which are formed from flat stock;

FIG. 9 illustrates an alternative use of spokes somewhat like the traditional radiating from eight separate locations;

FIG. 10 is an enlarged, broken, partially perspective view illustrating the interior of the wheel, tire, spoke, and hub with the offset interlocks which permit a single molded piece to form the body portion of the wheel;

FIG. 11 is a sectional view taken through the rim portion of the wheel and tire illustrating diagrammatically how the force lines are applied when the wheel is skidding;

FIG. 12 illustrates with force diagrams the effect of bouncing or shock absorbing of the wheel tire portion;

FIG. 13 is a plan view of the mold utilized to mold the tire to the wheel rim;

FIG. 14 is a sectional view taken along section lines 14—14 of FIG. 13 but enlarged in addition;

FIG. 15 is a comparable view to that of FIG. 14 but illustrating the assembly press employed on the rim portion of the wheel;

FIG. 16 is an enlarged partially diagrammatic view of the upper portion of the mold shown in FIG. 14 illustrating how the same swings away and into position for molding; and FIG. 17 is another view comparable to that of FIG. 16 but illustrating the mold in the closed configuration and further showing the use of a double shot of material to apply a softer material to the rim, and yet the different material to the tire portion.

DESCRIPTION OF PREFERRED EMBODIMENTS

Figure 1:
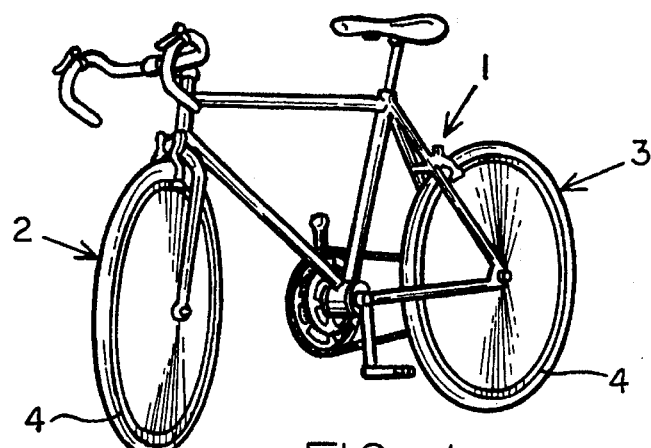
FIG. 1 is a perspective view of a typical bicycle illustrating a disc-type wheel.
Figure 2:
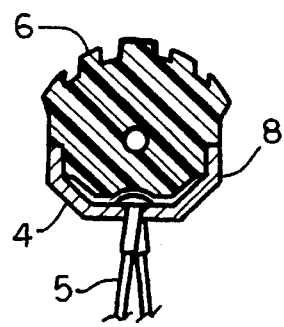
FIG. 2 is a typical cross-section of a molded tire interiorly of a conventional rim.
Figure 3:
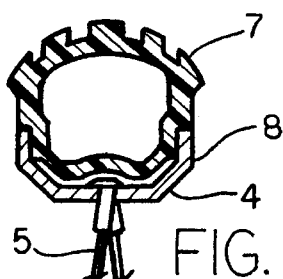
FIG. 3 is a cross-sectional view of a typical inflated tire on a conventional rim.

The subject matter of the invention will be best understood in the framework of the environment employed, and the prior art. As shown in FIG. 1, a bicycle 1 is illustrated having a wheel 2 and a rear wheel 3. Each of the wheels 2, 3 has a rim 4. A solid molded tire 6 is illustrated in FIG. 2 where it is rolled in place in the rim 4 and held there by the rim edge 6. The rim 4 shows diagrammatically the spokes of the bicycle wheel traditionally known. In FIG. 3, an alternative construction of the typical pneumatically inflated tire 7 is shown as it nests between the rim edges 8.

Turning now to FIG. 4A, which is taken at a section on the rim portion of the illustrative molded wheel 10 of the present invention, it will be seen that the flat cone 11 portion of the molded wheel terminates in a wheel rim portion 12. Desirably the flat cone portion is formed of a rigid strong material such as glass filled nylon. By utilizing double shot molding techniques, the rim portion 12 can be formed of a polypropylene or similar more yieldable type material. The tire 15 as illustrated in FIG. 4A and more particularly in FIG. 4B is molded to the rim 12 in a procedure to be described hereinafter. To be noted, however, is that there is a tire lock rib 18 formed which subsequently and simultaneously is fitted within the rim tire lock groove 16. Desirably the undercut 16 in the rib is slightly dovetail to the end that the formed rib is restrained against dislodgement. To be described hereinafter in greater detail are the voids, the outer rim void 40 and the inner rim void 41 which are separated by the rim void web 42. As will be explained hereinafter, these voids contribute to a more cushioned-like ride for the tire 15.

Two identical flat cones 11 are formed prior to forming the wheel assembly 10. In order to use one mold to develop the two sides of the flat cone 11, and insure their interlock, an interlock race 20 is provided in the rim portion desirably centrally of the rim tire lock groove 16. The interlock race 20, in turn, is made up of staggered teeth 21 and pockets 22. Each tooth and pocket is designed for a frictional interfit and may be dovetailed in the same fashion as the relationship between the rim tire lock groove 16 and the tire lock rib 18. This construction is illustrated by comparison between FIGS. 5 and 6.

The flat cone 11 has just been described in its relationship to the rim 12, but as shown in FIG. 7, it has a relationship to the hub assembly 25 which, in turn, includes an axle 26, an axle shaft 28, and a nut assembly 29 threadedly engaged with the ends of the axle 26.

To provide additional strength to the wheel, a plurality of radial triangular flat spokes 30 may be employed as illustrated in FIG. 8. Alternatively, eight spoke wires 31 may be employed as illustrated in FIG. 9.

Turning now to the exploded diagrammatic view in FIG. 10, it will be seen that the inner spoke end 34 is secured to the hub assembly 25 by means of a mushroom-like head. Similarly the remote end 32 of the spoke 31 has a mushroom-like head securing the same to the rim portion 12 of the wheel 10. Consistent with the philosophy of the interlock race 20 and its teeth 21 and pockets 22 of the rim 12, a comparable arrangement joins the two pieces of the hub assembly 25 through a hub race 35 which contains hub teeth 36 and hub pockets 38.

When the illustrative wheel and tire assembly 10 has been completed, as illustrated in FIGS. 11 and 12, it will be seen that the tire 15 resists dislodgement when lateral forces are applied such as shown in FIG. 11. There it will be appreciated that the tire lock rib 18 essentially digs into the rim tire lock groove 16 as dislodgement is attempted through a lateral force such a skidding. The other side of the coin is shock resistance as illustrated in FIG. 12. In that case, the rim outer void 40 takes the first portion of the blow, with the rim inner void 41 serving as an override feature and to further the structure's inherent resistance to bumps which will cause a deflection in the tire 15 and the wheel rim 12 before transmitting that shock to the flat cone portion 11 and thereby dissipate the major portion of the bump.

The method of manufacturing looks first to the molding of the two flat cones 11 which is not illustrated here. Once the two flat cones are molded, however, a press-like structure 50 is employed with two halves which squeeze the rim portions 12 into the intended interlocking fit. Thereafter, as illustrated n FIG. 15, a tire mold assembly 60 with a sprew 61 surrounds the rim portion of the wheel and through the sprew, of which there may be several, the urethane is injected which forms the tire portion 15 of the wheel assembly 10. As will be seen more particularly in FIG. 16, the mold 60 includes a toggle-like separation feature for one side 62 to be opened up, the wheel assembly 10 inserted in the mold 61, and thereafter locked followed by the insertion of the urethane material for the tire 15 through the sprew 61.

The materials anticipated in usage are, as described above, a glass reinforced nylon for the wheel flat cone 11. Also reinforced P.E.T., virgin or recycled, may be similarly employed. Rigid thermoplastic urethanes are also available for the flat cone portion 11 of the wheel assembly 10. Incorporated herein by reference is Canadian Patent No. 1,185,641 describing in detail the compositions employed for molding the tire 15 to the rim 12.

The tire or tread portion of the tire/wheel combination is formed using polyurethane material, in particular, a foamable polyurethane composition prepared by reacting together an organic polyisocyanate with a polyol formulation containing active hydrogen containing groups in the presence of a catalyst and a suitable blowing agent.

Suitable polyisocyanates include, for example, aromatic diisocyanates, such as, toluene diisocyanate, polymeric diphenyl methane diisocyanate, 4,4'-diphenyl methane diisocyanate, 1,5-naphthalene diisocyanate, and the like and polymethylene diisocyanates, such as, tetramethylene diisocyanate and hexamethylene diisocyanate, quasi-prepolymers and mixtures of such organic polyisocyanates. In practicing the present invention the preferred polyisocyanate is pure methylene diphenyl diisocyanates.

EXAMPLE

Isocyanate (MDI PRE-Polymer)

Dow Chemical-Isonate 240

ICI Polyurethanes-Isocyanate ES 12

BASF-WUC 3281T Isocyanate

A clear, medium viscosity modified diphenylmethane diisocyanate containing a high percentage of pure diphenylmethane diisocyanate and a lesser amount of diphenylmethane diisocyanate adducts.

TYPICAL ANALYSIS

Diphenylmethane Diisocyanate-51%

Modified isocyanate-<50%

Modified MDI-<2%

| PHYSICAL PROPERTIES | |
|---|---|
| Viscosity at 77-1200–1500 CPS | Color-yellow |
| Specific Gravity 0 1.1–1.22 | Flash point - >200° F. |
| Boiling Point at 760 mm HG-625F | Reacts with water. |

In general, any organic compound containing at least two active hydrogen atoms may be employed in the coating composition for reaction with the polyisocyanate to produce a polyurethane. Examples of suitable types of organic compounds containing at least two active hydrogen groups are caster oil, hydroxyl-containing polyesters, polyalkylene polyether polyols, hydroxy-terminated polyurethane polymers, polyhydric polythioethers, alkylene oxide adducts of acids of phosphorus, polyacetals, aliphatic polyols, as well as mixtures thereof.

Generally speaking any suitable hydroxyl-containing polyester polyol may be used such as are obtained from polycarboxylic acids and polyhydric alcohols. Polyether polyols can also be employed in this process, which are oxyalkylene polymers which have an oxygen/carbon atom ratio from about 1:2 to 1:4. Also, polyol blends such as mixture of high molecular weight polyether polyols with lower molecular weight polyether polyols or monomeric polyols can be used in preparing the polyurethane.

EXAMPLES OF POLYOLS

Dow Chemical-Voranol 2471-Polyether

ICI Polyirethanes-T 65000/30-Polyester

BAS-WUC-3784-Polyether Urethane Resin

This is a high reactivity capped triol. The polyol's high molecular weight and high primary hydroxyl contribute to high reactivity with aromatic and aliphatic isocyanate.

| PHYSICAL PROPERTIES -- HYDROXYL NUMBER-344.4 | | | |
|---|---|---|---|
| % water | .05 | Viscosity at 77 F--770CKS | |
| pH | 8 | Specific Gravity gm/cc - 1.02 | |
| Unsaturation | .08 | Flash Point (PMCC)F - 365 | |
| Color | Clear | | |

SUMMARY

In satisfaction of the previously mentioned objects and advantages the tire or tread portion of the tire/wheel invention is produced from dominantly microcellular polyurethane elastomers.

This process comprises mixing a formulation comprising (a) a polyol containing at least about 35% of its hydroxyl end-groups in the form of secondary hydroxyl end-groups, (b) polyisocyanate, (c) a catalyst, (d) a surfactants, and (e) a foaming agent comprising a blowing agent and a chain-extender selected from the group consisting of water, triols, and glycols, to form a homogeneous mixture.

The chemicals are dispensed into a mold which contains the preformed wheel assembly. The mold temperature is about 30°–70° C. and the mold is rotated at about 200–600 rpm during the foaming process.

ADDITIONAL DETAILS ON THE PROCESS

In a further embodiment of the present invention a tire/wheel assembly is produced by inserting a specially designed wheel in a mold, injecting polyurethane foam into that mold cavity, rotating that apparatus at about 200–600 rpm during the foaming process, and then removing the entire finished tire/wheel assembly from the mold.

The surface of the molds used in the process is optionally textured to impart any desired surface finish, and they may be machined to produce any tread pattern appropriate for the end products use.

By rotating the mold at high speeds during the foaming process the tendency for voids or sink marks is greatly reduced. In the making of any molded tire from foamed polyurethane there is encountered the problem of controlling the air-cell formation, or foaming action, so as to obtain not only a desired cellular structure, but also a desired distribution of the material.

Prior art clearly indicates that such control may be effected in a highly satisfactory manner by use of centrifugal action, instead of conventional molding, to form shaped articles from foamed polyurethane, or from other gellable, foamable resin compositions; particularly, in the case of polyurethane, by utilizing this method at the proper stage in the formation of the polyurethane and by otherwise controlling the reaction between the components that form the same.

It is another detailed object of the present invention to produce the tire portion of the tire/wheel assembly from a foamable synthetic resin composition in which the formation of gas bubbles may be so controlled as to increase their size more or less uniformly, while at the same time maintaining a desired distribution thereof.

As explained above, polyurethane foams are obtained by reacting diisocyanate (MDI) with a selected polyether or polyester resin, or mixtures thereof, characterized by having a surplus of reactive hydroxyl groups, under proper conditions, including usually the addition of a catalyst. The presence of the active hydrogens in the hydroxyl groups results in an additional polymerization with incidental evolution of the carbon dioxide that was originally considered an undesired result. Also, incidentally to the reaction, the resulting polyurethane starts promptly to gel or set and such gellation requires to be not only correlated with the progress of the reaction, but with any manipulation to which the resulting product is subjected.

The speed of foaming is quite rapid, and if during the foaming stage, the tire being molded is subjected to centrifugal force, and more particularly such force as is engendered by a relatively high rate of speed of rotation, not only may the size of the bubbles, and thus of the cells in the resultant product be controlled, but a more uniform distribution thereof obtained. In particular, where the foaming action is such as to produce a multitude of minute gas bubbles in the body of resin composition, the result is to cause such bubbles to coalesce so as to increase in size progressively onward from the axis of rotation. At the same time, the intervening web structure is caused to thicken in the outer portion of the body thus forming a denser, more abrasive resistant tire tread. As a result of centrifugally molding the tire, the surface portion of the article being molded, both on the outer periphery and on the sides adjacent thereto, develops a "skin" which is substantially free of bubbles and so of relatively higher density than the adjacent interior portion of the article. By proper control of the operation, such "skin" may be made of such thickness as to be the equivalent of a high strength facing material. As indicated, this inherently developed "skin" is of primary importance as a reinforcement of the side wall of the tire. After the mold has been closed and the material has been dispensed, the mold is rotated about its axis. Constant mold temperature is very important at this point. The speed will, of course, be varied to secure a comparable centrifugal force where the radius is shorter or longer, also may be required by the degree of liquidity of the material, the manner in which the bubble forming gas is generated and the time required to gel. The foregoing factors will, of course, also affect the length of time required for this centrifuging operation.

In any event, the amount of material placed in the mold should be less than required to fill such mold prior to expansion of the material by the formation of gas bubbles therein. As a result, whether it be deposited as a layer in the bottom of the mold, or introduced adjacent the axis thereof, the initial effect of the centrifugal force is to throw the body of material radially outwardly where it collects in the form of an annulus that is confined against further movement in the direction, as well as transversely thereof, but is left free to expand in a radially inward direction, as the volume thereof is increased by the formation of gas bubbles. Rotation of the mold is continued until the material has gelled sufficiently so that at least in the outer annular portion thereof the cellular formation resulting from the centrifugal action will remain substantially unchanged. The mold may then be simply allowed to stand until the reaction which forms the tire is completed and the product is sufficiently cured to allow proper removal from the mold.

It will be understood that various changes in the details, materials and arrangements of parts which have been herein described and illustrated in order to explain the nature of the invention, may be made by those skilled in the art within the principle and scope of the invention as expressed in the appended claims.

What is claimed:

1. A wheel and tire assembly comprising in combination, a wheel having an outer rim void and an inner rim void separated by a web and further having a pair of rim lock grooves located on said wheel between said outer and inner rim voids; a solid polyurethane tire having a substantially U-shaped cross-section with the two legs of the U-shape, each provided with a lock rib means, wherein, when said tire is mounted onto said wheel, said legs of said U-Shaped cross-section substantially surrounds said outer rim void and said lock ribs lit into said rim lock grooves of said wheel to form a shock-absorbing structure.

* * * * *